(12) United States Patent
Chen et al.

(10) Patent No.: US 7,315,100 B2
(45) Date of Patent: Jan. 1, 2008

(54) MOTOR AND MAGNETIC BEARING ASSEMBLY THEREOF

(75) Inventors: Lee-Long Chen, Taoyuan Hsien (TW); Chien-Hsiung Huang, Taoyuan Hsien (TW); Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/060,759

(22) Filed: Feb. 18, 2005

(65) Prior Publication Data

US 2005/0184609 A1   Aug. 25, 2005

(30) Foreign Application Priority Data

Feb. 20, 2004   (TW) .............................. 93104224 A

(51) Int. Cl.
 *H02K 21/00* (2006.01)

(52) U.S. Cl. ..................... 310/90.5; 310/67 R

(58) Field of Classification Search .............. 310/67 R, 310/90, 90.5, 156.12; 360/98.07, 99.04, 360/99.08; 384/100, 107, 446
See application file for complete search history.

(56) References Cited

U.S. PATENT DOCUMENTS

| | | | |
|---|---|---|---|
| 3,663,075 A | 5/1972 | Kronenberg | |
| 3,934,950 A | 1/1976 | Kuhlmann | |
| 4,340,260 A | 7/1982 | Forster et al. | |
| 4,755,709 A | 7/1988 | De Jager et al. | |
| 5,019,738 A | 5/1991 | Weilbach et al. | |
| 5,280,208 A | 1/1994 | Komura et al. | |
| 5,507,629 A | 4/1996 | Jarvik | |
| 5,561,335 A | 10/1996 | Dunfield et al. | |
| 5,840,070 A | 11/1998 | Wampler | |
| 5,894,181 A | 4/1999 | Imlach | |
| 6,172,847 B1 * | 1/2001 | Sakatani et al. | ......... 360/99.08 |
| 6,255,752 B1 * | 7/2001 | Werner | ...................... 310/90.5 |
| 6,265,798 B1 | 7/2001 | Huang et al. | |
| 6,356,408 B1 * | 3/2002 | Nii et al. | ................. 360/98.07 |
| 6,414,411 B1 | 7/2002 | Horng et al. | |
| 2003/0146668 A1 * | 8/2003 | Sun et al. | .................. 310/90.5 |

FOREIGN PATENT DOCUMENTS

| | | |
|---|---|---|
| DE | 19910872 A1 | 10/1999 |
| DE | 1048863 A2 | 11/2000 |

(Continued)

*Primary Examiner*—Karl Tamai
*Assistant Examiner*—David W. Scheuermann
(74) *Attorney, Agent, or Firm*—Birch, Stewart, Stewart & Birch, LLP

(57) ABSTRACT

A motor comprising a stator, a rotor, and a plurality of blades. The stator comprises a stator base with an opening, a first magnetic structure disposed at a bottom of the opening, a magnetic pole disposed on the stator base, and a second magnetic structure disposed at a top of the magnetic pole. The rotor, coupled to the stator, comprises a hub, a shaft, a third magnetic structure disposed at the hub and encircled one en of the shaft and corresponded to the first magnetic structure, and a fourth magnetic structure disposed at the hub without contacting the second magnetic structure. The blades encircle the rotor. The first and third magnetic structures attract the second and the fourth magnetic structures, respectively.

16 Claims, 5 Drawing Sheets

| | FOREIGN PATENT DOCUMENTS | | |
|---|---|---|---|
| JP | 55-36635 A | 3/1980 | |
| JP | 58-83552 A | 5/1983 | |
| JP | 64-39926 U | 3/1989 | |
| JP | 5-146109 A | 6/1993 | |
| WO | WO-2004/020850 A1 | 3/2004 | |

* cited by examiner

MOTOR AND MAGNETIC BEARING ASSEMBLY THEREOF

BACKGROUND

The invention relates to a motor, a fan, and a magnetic bearing assembly thereof, and in particular to a motor, a fan, and a magnetic bearing assembly thereof with characteristics of less abrasion, low noise level, low costs, and longer lifetime.

A conventional motor comprises a shaft, a rotor, and a bearing. The rotor is disposed on the shaft and supported by the bearing, enabling the rotor to rotate smoothly.

Conventional bearings include ball bearings, sleeve bearings, dynamic bearings, and magnetic bearings.

The structure of the ball bearing, however, is weak and susceptible to impact. When the motor with the ball bearing operates, the balls are rolling at high speed and producing excessive noise. The ball bearing requires a higher degree of accuracy, thus increasing manufacturing costs.

A sleeve bearing is formed by mixing and sintering bronze powder, iron powder, nickel powder, lead powder and other metal powders. Lubricant is applied into the pores of the bearing. When the motor operates, lubricant exudes from the bearing such that the rotor rotates in the lubricant. This type of bearing can sustain higher impact than the ball bearing, and manufacturing costs are also reduced. In a motor utilizing the sleeve bearing, however, the lubricant evaporates into gas as the bearing operates over long periods. As a result, the shaft directly contacts the bearing such that friction is produced therebetween. Furthermore, nitrides can possibly form at the ends of the bearing, causing damage and excessive noise. In addition, dust in the air may be drawn into the center of the motor during operation, contaminating the lubricant surrounding the bearing, increasing the noise level and occluding moving parts. Furthermore, since the gap between the bearing and the shaft is small, the efficiency in starting the motor is reduced.

A dynamic bearing is a variation of the sleeve bearing. This type of bearing comprises an inner wall with two annular arrays of V-shaped grooves formed therein, preventing lubricant evaporation. Formation of the grooves on the inner side of the dynamic bearing, however, requires precise manufacturing. Thus, the manufacturing cost is higher than other types of bearings. Moreover, the dynamic effect is not achieved at low speeds, such that performance of the dynamic bearing is substantially the same as a sleeve bearing.

To solve the above problems, a magnetic bearing is disclosed in U.S. Pat. No. 6,414,411. A rotor, a stator, and a balance plate are combined in such way that attraction is generated between the rotor and the balance plate. In this structure, however, the magnetic bearing does not disclose a radial supporting structure, and consequently, the shaft and the bearing may collide during operation, reducing product life of the motor and producing excessive noise.

Furthermore, other patents such as Japan No. S55-36635 (4), Japan No. S64-39926, Japan No. H05-146109, Japan No. S58-083552, U.S. Pat. No. 6,265,798, U.S. Pat. No. 5,507,629, U.S. Pat. No. 5,840,070, U.S. Pat. No. 3,934,950, U.S. Pat. No. 3,663,075, U.S. Pat. No. 4,340,260, U.S. Pat. No. 5,894,181, U.S. Pat. No. 5,280,208, and U.S. Pat. No. 5,019,738, disclose similar structures with the same magnetic polarity designed at a shaft of a rotor and a stator base, thereby the like poles produce repulsive force therebetween such that repulsive force suspends the shaft in the stator base without direct contact. The repulsive force, however, may be diminished if the position of the shaft is offset by external force or driving force during operation, the imbalance can cause the shaft to contact or be expelled from the stator base.

In addition, another U.S. Pat. No. 5,561,335 discloses additional magnets attached to two ends of the magnet of the rotor, providing magnetic balance of the shaft, as shown in FIG. 7 in U.S. Pat. No. 5,561,335. During operation, however, if the magnet is disposed at an incorrect attractive angle with an incorrect moment arm of the magnet, the additional magnet may be adversely frozen due to magnetic attraction, and thus operation is interrupted.

Thus, collisions between the shaft and the bearing may easily occur in conventional motors. This produces excessive noise, shortens product life, and can interrupt normal motor operation. Hence, it can be seen, the magnetic bearing is still in an experimental stage, and is not yet ready for mass production.

SUMMARY

Embodiments of the invention, therefore, provide a motor that eliminates the previously described shortcomings.

Embodiments of the invention additionally provide a motor and a magnetic bearing assembly thereof with lower manufacturing cost, lower friction, enhanced performance, longer product life, and lower noise.

Embodiments of the invention further provide a motor comprising a stator, a rotor, and a plurality of blades. The stator comprises a stator base with an opening, a first magnetic structure disposed at a bottom of the opening, a magnetic pole disposed on the stator base, and a second magnetic structure disposed at a top of the magnetic pole. The rotor, coupled to the stator, comprises a hub, a shaft, a third magnetic structure disposed at the hub and encircled one en of the shaft and corresponded to the first magnetic structure, and a fourth magnetic structure disposed at the hub without contacting the second magnetic structure. The blades encircle the rotor. Magnetic attraction is generated between the first magnetic structure and the third magnetic structure. Additionally, is magnetic attraction is generated between the second magnetic structure and the fourth magnetic structure.

Embodiments of the invention also provide a motor comprising a mutually attractive rotor and stator. The stator comprises a stator base with an opening, a first magnetic structure disposed at a bottom of the opening, or a protrusion protruded from a sidewall of the opening. The rotor, coupled to the stator, comprises a hub, a shaft, a second magnetic structure, disposed at the hub, encircling one end of the shaft protruded from a side of the hub and corresponding to the first magnetic structure, and a third magnetic structure, disposed at other end of the shaft protruded from other side of the hub. The housing surrounds the stator and the rotor, comprising a fourth magnetic structure disposed at the housing above and without contacting the third magnetic structure. The blades encircle the rotor. Magnetic attraction is generated between the first and the second magnetic structures; and magnetic attraction is generated between the third and the fourth magnetic structures.

In embodiments of the invention, the magnetic structure at the bottom of the opening comprises a central magnet and a surrounding magnet encircling a periphery of the central magnet such that two magnets are mutually attracted. The magnetic structure on the rotor corresponding to the magnetic structure at the bottom of the opening and the surrounding magnet are mutually attracted, and the shaft and the central magnet attract each other.

Furthermore, an end surface of the shaft is flat, curved, tapered with a curved end, concave, convex, or combinations thereof. The end portion of the shaft contacts the magnetic structure at a contact point or via a little contact area.

In another embodiment, a wear-resistant structure can be formed on a contact surface between the magnetic structure and the shaft. The shape of the wear-resistant is flat, curved, tapered with a curved end, concave, convex, or combinations thereof.

The magnetic structures are connected by engaging, gluing, integral formation as a single piece, inserting, clamping, or combinations thereof. A magnetic conduction layer is formed on the opposing magnetic surfaces of the magnetic structures. An axial cross section of the magnetic conduction layer is indented radially inward or outward, ring-shaped, circular, elliptical, polygonal, flat, or combinations thereof. In addition, the external periphery of the magnetic conduction layer comprises notches, or the inner periphery thereof comprises notches. The magnetic conduction layer comprises a magnetic conduction metal plate, a non-metal plate, an iron plate, or combinations thereof.

At least one blade is formed on a periphery of a hub of the motor to form a magnetic bearing assembly.

One embodiment of the invention provides a magnetic bearing assembly comprising an upper (first) and a lower (second) hub. The upper hub comprises a first opening, a first magnetic structure disposed at a bottom of the opening or a first protrusion protruded from a sidewall of the opening, and a second magnetic structure disposed at a periphery of the opening. The lower hub comprises a main body with a second protrusion protruded from a side of the main body, a third magnetic structure disposed at the main body and encircling one end of the second protrusion and corresponding to the first magnetic structure, and a fourth magnetic structure disposed at the main body above or below without contacting the second magnetic structure. Magnetic attraction is generated between the first and the third magnetic structures; and magnetic attraction is generated between the second and the fourth magnetic structures.

Embodiments of the invention further provide a magnetic bearing assembly comprising mutually attractive hubs and a shaft. The hubs comprise a hollow portion, a magnetic structure disposed at an end inner-surface thereof, and another magnetic structure disposed at the opposing end inner-surface thereof. The rotor comprises a loader, a protrusion located on a top of the loader and protruding from the hub, a protrusion located at a bottom of the loader, two magnetic structures corresponding to two magnetic structures disposed at the hubs. The corresponding magnetic structures are attracted each other.

In embodiments of the invention, the rotor only contacts the stator at a contact point, and during operation, it is possible that there is no contact therebetween due to the buoyant air force. Thus, the noise level of the motor is reduced, and product life is increased.

Furthermore, magnetic attraction generated by the shaft and buoyant air force produced by rotation allow the shaft to rotate without contact, thus minimizing noise level and increasing product life thereof.

The embodiments of the invention do not require a conventional bearing, and since conventional elements and assembling procedures are eliminated, manufacturing and assembly cost are thus reduced.

The magnetic bearing assembly can substitute for the conventional magnetic bearing without modifying the connections between the fan and the motor, lowering friction therebetween, thus providing enhanced performance.

Furthermore, the fan or motor according to embodiments of the invention do not have start-up and balance problems. Thus, the invention allows mass production of the motor.

DESCRIPTION OF THE DRAWINGS

Embodiments of the invention can be more fully understood by reading the subsequent detailed description in conjunction with the examples and references made to the accompanying drawings, wherein.

DETAILED DESCRIPTION

Figure 1:
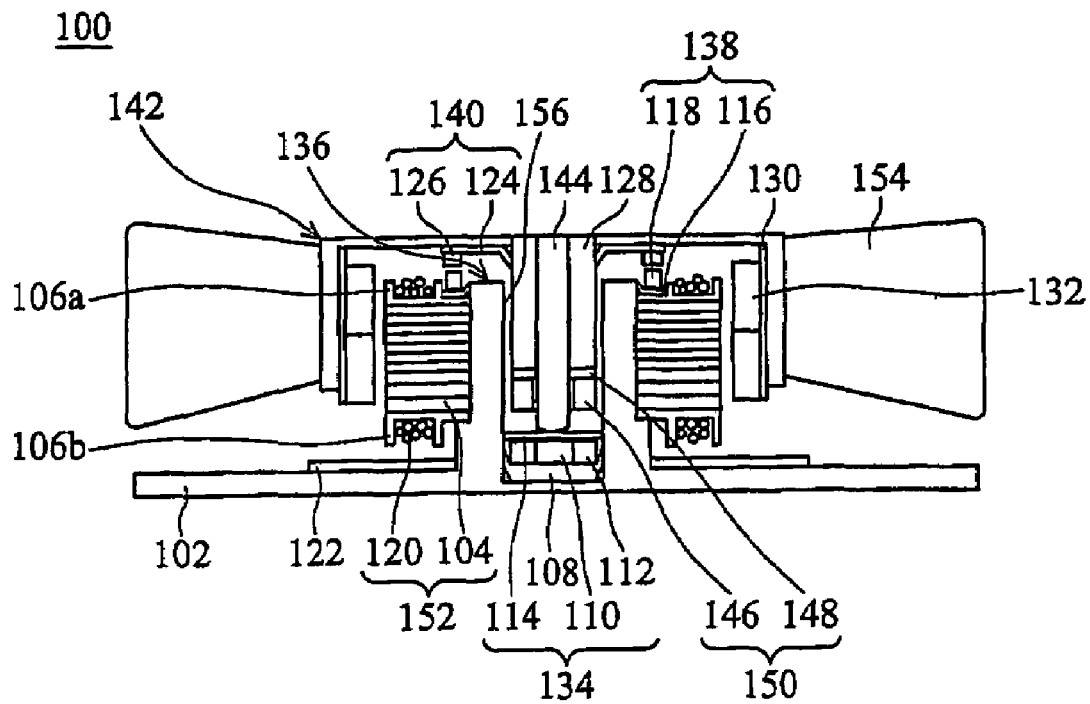
FIG. 1 is a schematic diagram of a motor of a first embodiment of the invention.

FIG. 1 is a schematic diagram of a motor 100 of a first embodiment of the invention. The motor 100 comprises a rotor 142 and a stator 136. When stationary, the rotor 142 contacts the stator 136 at a contact point. During operation, the rotor 142 and the stator 136 are connected at a contact point or without contact.

The stator 136 comprises a stator base 102, a magnetic pole 152, magnetic structures 134 and 138. The stator base 102 comprises an opening 156 at a center thereof. The stator base 102 is protruded or tube-shaped for loading the rotor 142. The stator base 102 comprises plastics, non-magnetic conduction rigid material, metal, or alloy.

The magnetic pole 152 of the stator 136 encircles a periphery of the stator base 102 and is fixed thereon. The magnetic pole 152 comprises silicon steel 104 and a solenoid 120 for actuating and driving the rotor 142. The magnetic pole 152 can be an axial solenoid (as shown in FIG. 1), or a radial solenoid. The silicon steel 104 can be substituted by other types of magnetic conduction rigid materials. The solenoid 120 comprises metal, alloy or conductive materials.

Additionally, insulated structures 106a and 106b can be formed between the silicon steel 104 and the solenoid 120, preventing electrical connection therebetween.

The magnetic structure 134 comprises a wear-resistant structure 114, and magnets 110 and 112. Note that the magnets 110 and 112 have different magnetism, and the magnet 112 encircles a periphery of the magnet 110. The magnetic structure 134 is connected at the bottom of the opening 156 by engaging, gluing, integral formation as a single piece, inserting, clamping, or combinations thereof. The other magnetic structure 138 comprises a magnet 118. The magnetic structure 138 is connected at the periphery of the opening 156 of the stator base 102 or the top of the magnetic pole 152 by engaging, gluing, integral formation as a single piece, inserting, clamping, or combinations thereof. The magnets 110, 112, and 118 are cylindrical, circular, polygonal, flat, closed, or block-shaped. The magnets 110, 112, and 118 comprise magnetic materials or magnetized magnetic conduction material. The wear-resistant structure 114 is positioned between the magnetic structure 134 and the shaft 144. The wear-resistant structure 114 comprises durable material with a surface facing the rotor 142. The shape of the surface is flat, spherical, curved, elliptical, concave or convex, tapered with a curved end, or combinations thereof.

Furthermore, to uniformize the magnetism of the magnets 110, 112, and 118 and increase magnetic effect thereof, magnetic conduction layers 108 and 116 can be formed on opposing magnetic faces of the magnets 110, 112, and 118. Furthermore, the magnets 110, 112, and 118 and the magnetic conduction layers 108 and 116 can be connected by gluing, mounting and inserting, engaging, or clamping.

The method of connecting the magnetic structure 134 or 138 by clamping is described in the following. The magnets 110, 112, or 118 are fixed on the magnetic conduction layer 108 or 116. A periphery of the magnetic conduction layer 108 or 116 is an axially bent sloped side, and the maximum or minimum internal radius of the sloped side is slightly greater than the internal radius of the opening 156. The magnetic conduction layer 108 or 116 is then pressed down to the bottom of the opening 156. An edge of the magnetic conduction layer 108 or 116 concurrently generates an elastic recovery force, thereby fixing the edge to the bottom of the opening 156. The bottom of the opening 156 additionally comprises an engaging structure, or a corresponding engaging structure is formed between the opening 156 and the magnetic conduction layers 108 and 116. The magnetic conduction layer 108, 116 is optional and does not have to be sloped. The maximum or minimum radius of the magnetic conduction layers 108 and 116, respectively are substantially equal to the internal radius of the opening 156.

Figure 7A:
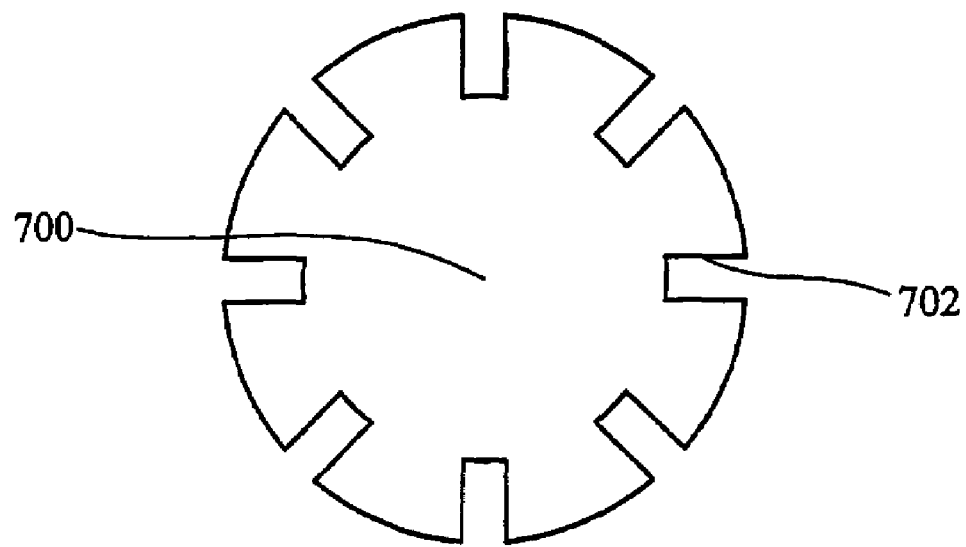
FIGS. 7A and 7B are schematic diagrams of a magnetic conduction layer of embodiments of the invention.
Figure 7B:
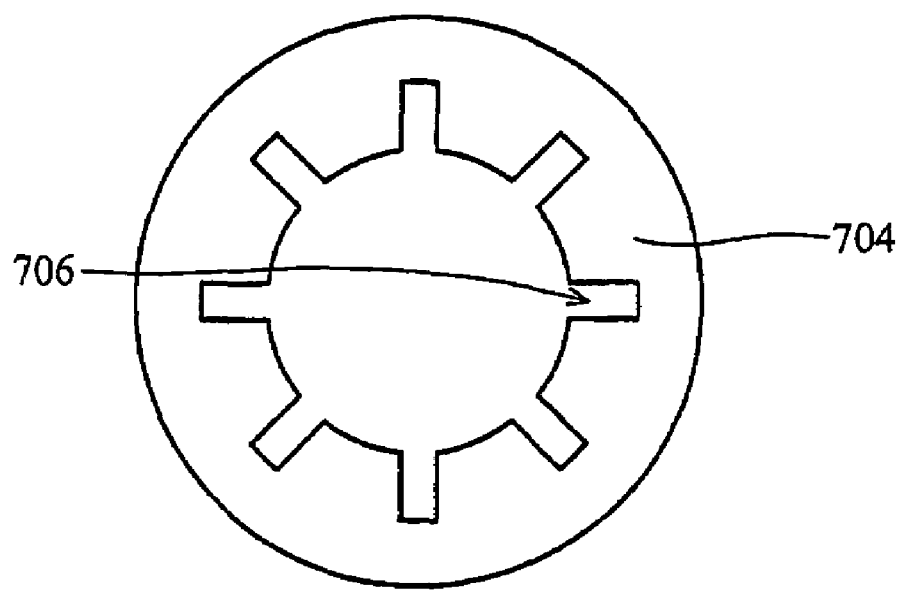

Moreover, an axial cross section of the magnetic conduction layers 108 and 116 can be indented radially inward or outward, ring-shaped, circular, elliptical, polygonal, flat, or combinations thereof. As shown in FIG. 7A, the cross section of the magnetic conduction layer 700 has an outer periphery with notches 702. In FIG. 7B, another cross section of the magnetic conduction layer 704 has an inner periphery with notches 706. The magnetic conduction layer 108, 116 comprises a magnetic conduction metal plate, a non-metal plate, an iron plate, or combinations thereof.

Additionally, as shown in FIG. 1, a driving circuit 122 can be formed on the stator 136 to adjust magnetism of the magnetic pole 152. The driving circuit 122 can also be directly disposed on the stator base 102 or disposed outside the motor 100 and connected externally.

A side of the stator 136 is covered by the rotor 142, and the rotor 142 is coupled to the stator 136. The rotor 142 comprises a hub 128, magnetic structures 140, 150, a shaft 144, and a rotary magnet 132. The hub 128 is cylindrical or protruded, comprising plastics, metal, or other rigid material.

The shaft 144 extends axially and protrudes from the hub 128, acting as a rotational shaft for the rotor 142. The shaft 144 extends into the opening 156 without contacting a sidewall of the opening 156. The shaft 144 comprises magnetic conduction materials such as magnetic conduction metals or magnetic conduction plastics. The shaft 144 may directly contact the wear-resistant structure 114, or via intermediate structures such as balls. An end surface of the shaft 144 can be flat, curved, tapered with a curved end, concave, convex, or combinations thereof. The end portion of the shaft 144 contacts the wear-resistant structure 114 at a contact point or via a little contact area.

A rotary magnet 132 encircles the magnetic pole 152. The rotary magnet 132 comprises at least one magnet, comprising multiple poles, each having a different polarity from an adjacent magnet thereof. The position of the rotary magnet 132 and the number of poles thereof correspond to the position of the magnetic pole 152 and the number of poles thereof. The rotary magnet 132 comprises permanent magnets, permanent magnetic tape, rubber magnets, rubber magnetic tape, or other magnetic structures.

Another magnetic conduction layer 130 may be disposed between the hub 128 and the rotary magnet 132 to concentrate magnetism of the rotary magnet 132, thereby preventing magnetic force thereof from spreading outward. The magnetic conduction layer 130 also comprises a magnetic conduction metal plate, a non-metal plate, an iron plate, or combinations thereof. Furthermore, if the hub 128 is magnetically magnetic conduction, the magnetic conduction layer 130 can be omitted.

The magnetic structures 140, 150 are disposed above the hub 128, respectively attracting the magnetic structures 138, 134. The positions and the magnetism of the magnetic structures 140, 150 correspond to those of the magnetic structures 138, 134. The magnetic structure 140 comprises a magnet 126, attracting the other magnet 118. That is, the magnets 126 and 118 have opposite polarities. Furthermore, the magnetic structure 140 can be connected to a magnetic layer 124 on the magnet 126.

Additionally, the magnetic structure 150 comprises a magnet 146 and a magnetic conduction layer 148. The magnets 146 and 112 are mutually attracted with different polarities. Due to permeability of the magnetic conduction layer 148, magnetic attraction between the shaft 144 and the magnet 110 are enhanced. The magnetic structure 150 can be disposed at a periphery of the end of the shaft 144 or encircled one end of the shaft 144. The cross section of the magnets 126, 146 can be circular or other closed-shaped. The material and connection between the magnetic layers 124, 128 are identical to the above embodiments, thus they are omitted here.

Moreover, a periphery of the rotor 142 is encircled with a plurality of blades 154 such that during rotation, airflow is produced by the motor 100. The blades 154 can be centrifugal, flat, or axial.

FIG. 1 shows an example of a motor 100, explaining how to balance the rotor 142 therein. During rotation, if the rotor 142 or the stator 136 is offset radially due to any radial force, since the magnetic structures 134, 150 located at the bottom of the shaft 144 comprises the magnets 112 and 146 with mutually attractive force therebetween and the magnets 110 and 146 with repulsive force therebetween (note that the acting directions of the attractive and repulsive forces are in opposite directions and varying with the radial force) and because of the attractive force between the magnetic structures 138 and 140 located at the top of the rotor 142 or a portion of the stator base encircled the opening 156, the shaft 144 is promptly returned to its original position.

Moreover, when the rotor 142 receives a force in an inclined direction, since the attractive force between the magnetic structures 138 and 140 toward the center thereof helps guide the rotor 142 to a correct position, the external force is counterbalanced such that the shaft 144 of the rotor 142 returns to the central position surrounded by the magnetic structures 138 and 140. Alternatively, when the rotor 142 receives a force in an axial direction, the axial force is counterbalanced by the axial attractive force between the magnetic structures 138 and 140, between the magnets 112 and 146, and between the shaft 144 and the magnet 110, and an axial supporting force produced by the wear-resistant structure 114 to the shaft 144, thereby maintaining the shaft 144 at the center of the predetermined position.

Figure 2:
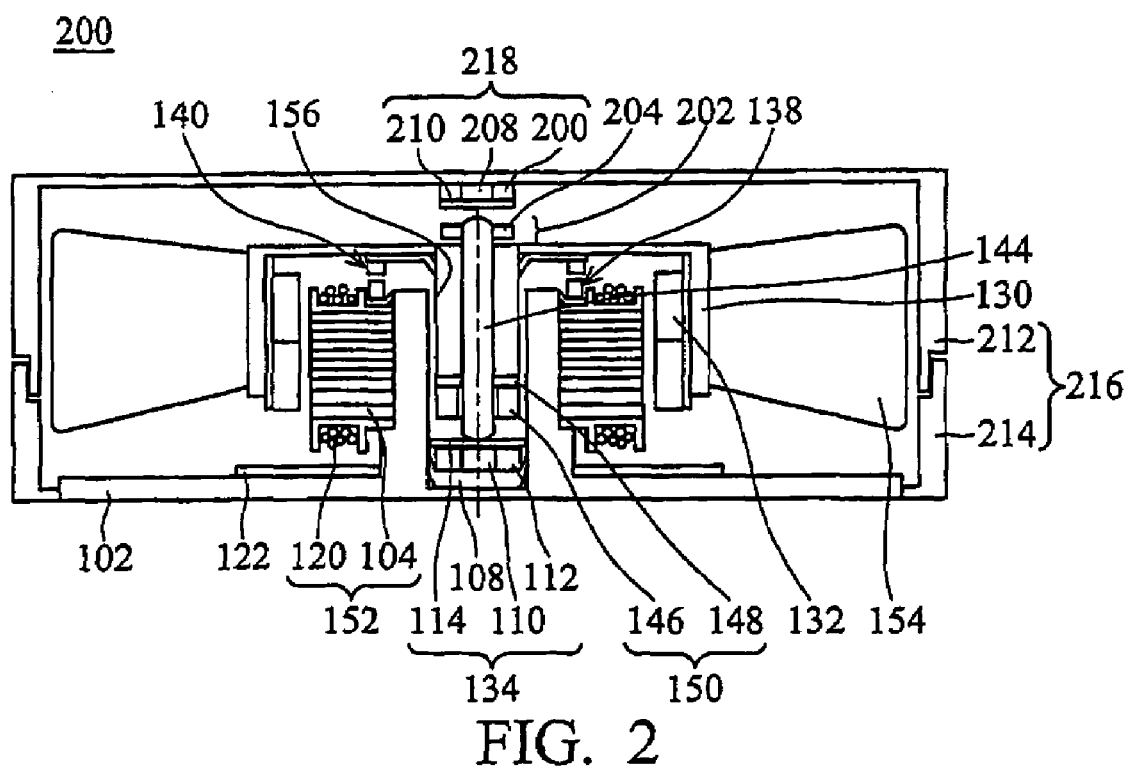
FIG. 2 is a schematic diagram of a motor of a second embodiment of the invention.

FIG. 2 is a schematic diagram of a motor 200 of a second embodiment of the invention, from which elements common to the first embodiment are omitted. The difference is that the shaft 144 comprises a protrusion 202 protruding from an opposite side of the hub 128. Two magnetic structures 204 and 218 are disposed on the protrusion 202 (or the external side of the hub 128) and the corresponding hub 126, respectively. The two magnetic structures 204 and 218 are formed correspondingly and attracting each other. That is, the magnetic structures 204 and 218 have opposite polarity. The magnetic structures 204 at other end of the shaft 144 protruded from other side of the hub 128. The magnetic structure 218 is disposed at the housing 216 above and not touched the magnetic structures 204.

The housing 216 contains the stator 136 and the rotor 142 and may comprise sub housings 212 and 214 or be integrally formed as a single piece. The housing 216 may also be formed by a plurality of sub housings. Furthermore, the housing 216 comprises at least one vent for air to flow through.

The magnetic structure 204 is disposed on an external side of the hub 128. The magnetic structure 204 comprises magnetic materials or magnetized magnetic conduction materials. The shape of the magnetic structure 204 can be circular or other closed-shape. The magnetic structure 204 may comprise a magnetic conduction layer to uniformly magnetize the magnetic structure 204. Moreover, the magnetic structure 204 and the hub 128 or the protrusion 202 can be connected by engaging, gluing, integral formation as a single piece, inserting, clamping, or combinations thereof.

Furthermore, the magnetic structure 218 comprises a wear-resistant structure 210, and magnets 206 and 208. The polarity of the magnet 206 is different from that of the magnet 208 and the magnetic structure 204. The magnet 206 encircles the magnet 208. The magnetic structure 218 is correspondingly fixed to the shaft 144 by engaging, gluing, integral formation as a single piece, inserting, clamping, or combinations thereof. The magnets 206 and 208 can be cylindrical, ring-shaped, polygonal, polyhedral, flat, closed-shaped, or block-shaped. The magnets 206 and 208 may comprise magnetic material or magnetized magnetic conduction materials. The wear-resistant structure 210 comprises durable materials. The wear-resistant structure 210 comprises a side facing a side of the rotor 142, the side being flat, curved, tapered with curved end, concave or convex.

In this embodiment, the wear-resistant structure is disposed on the contact surface of the two ends of the shaft, which is magnetized. Thus, one end is in direct contact, and the other end is in contact during rotation, thereby maintaining axial and preventing the rotor from axial vibration or offset.

Additionally, the corresponding magnetic structures 138, 140 or the other set of magnetic structures 204 and 206 are optional and can be omitted, depending on requirements.

Figure 3:
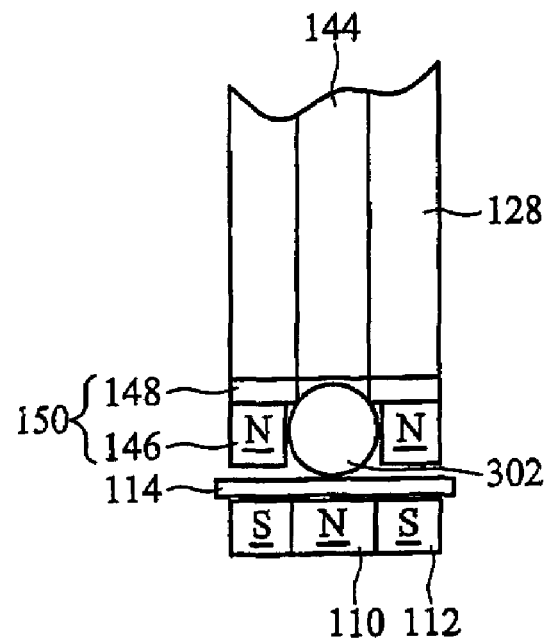
FIG. 3 is a local enlarged view of a motor of a varied embodiment of the first embodiment of the invention.

FIG. 3 is a local enlarged view of a motor of a variation of the first embodiment. As shown in FIGS. 1 and 3, the shaft 144 does not contact the wear-resistant structure 114 of the magnetic structure 134. An intermediate structure 302 is formed between the magnetic structures 134 and 150 and contacts the wear-resistant structure 114 at a contact point or via a little contact area. During operation, the intermediate structure 302 rotates with the rotor 142. The intermediate structure 302 comprises magnetic conduction metal, magnetic conduction plastics, or other magnetic conduction materials. The intermediate structure 302 can be spherical, elliptical, turbinate, tapered with a curved end, arrow-shaped with a curved end, and combinations thereof. Moreover, the intermediate structure 302 comprises a curved face on one side or both sides thereof. A contact surface between the intermediate structure 302 and the wear-resistant structure 114 can be curved, tapered with curved end, concave or convex, in which the curve can be a radius of curvature of a circle. The intermediate structure 302 and the magnetic structure 134 are connected by clamping, engaging, gluing, welding, or inserting.

Furthermore, the intermediate structure 302 can be fixed on a magnetic structure 150, the shaft 144, the hub 128, or combinations thereof. If the hub 128 is magnetic conduction, the shaft 144 cannot be formed.

Figure 8:
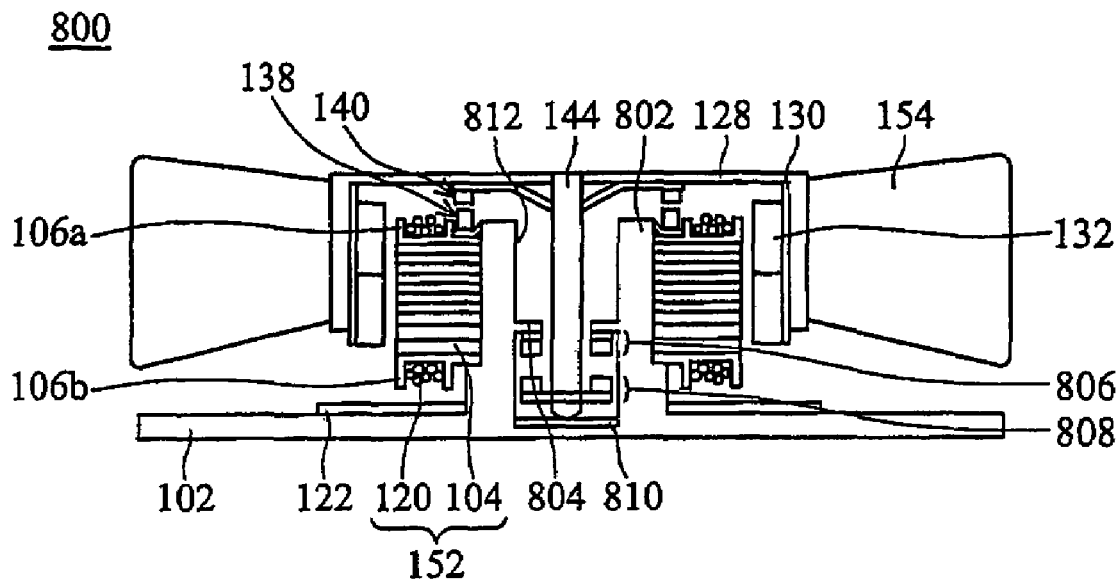
FIG. 8 is a schematic diagram of a motor of a third embodiment of the invention.
Figure 9:
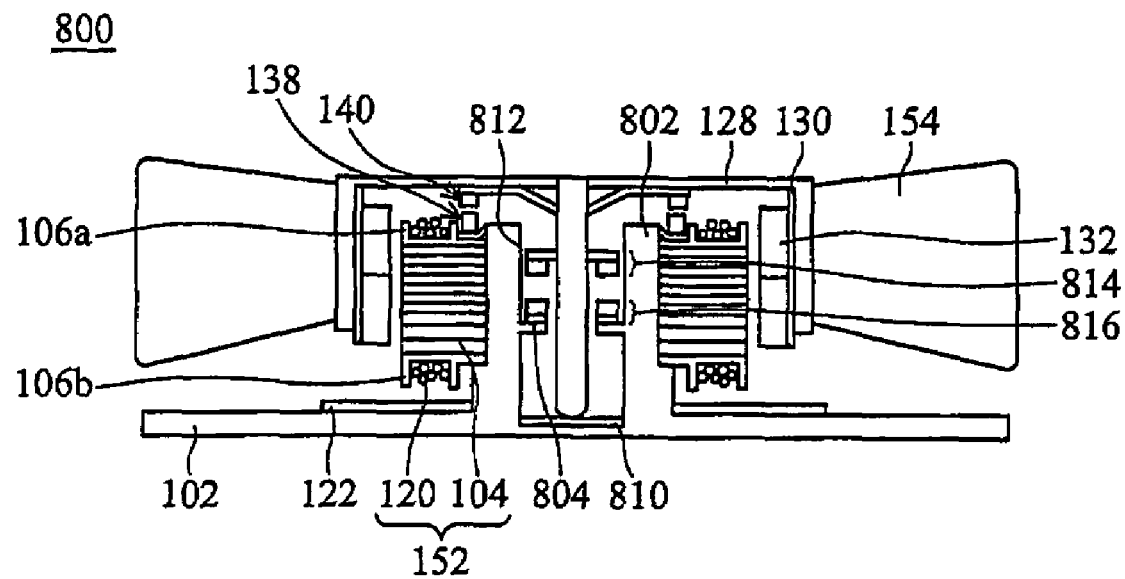
FIG. 9 is a schematic diagram of a motor of a variation of the third embodiment.

FIG. 8 is a local enlarged view of a motor 800 of a third embodiment of the invention, from which elements common to the first embodiment are omitted. The difference is that a protrusion 804 protrudes from a sidewall of an opening 812 of the stator base 802, and a magnetic structure 806 is formed on an under portion of the protrusion 804, or a magnetic structure 816 is formed on an upper portion of the protrusion 804, as shown in FIG. 9. Another magnetic structure 808 or 814 disposed on the shaft 144 is located corresponding to the magnetic structure 806, or 816. The magnetic structures 806 and 808, or 814 and 816 attract each other. Moreover, a wear-resistant structure 810 is formed on a bottom of the opening 812 to contact the shaft 144 at a contact point or via a little contact area, or without any direct contact therebetween. The magnetic structures 806, 808, 814 and 816 are identical to the above embodiments, thus further explanation is omitted. The position of magnetic structure 806 and 814 are higher than that of the magnetic structure 808 and 816.

In a varied embodiment, the shaft 144 can be omitted and replaced by the intermediate structure, acting as a rotational shaft. This may also be implemented in the second embodiment such that the rotor and a central portion of the intermediate structure are connected, and the intermediate structure replaces the shaft.

Figure 4:
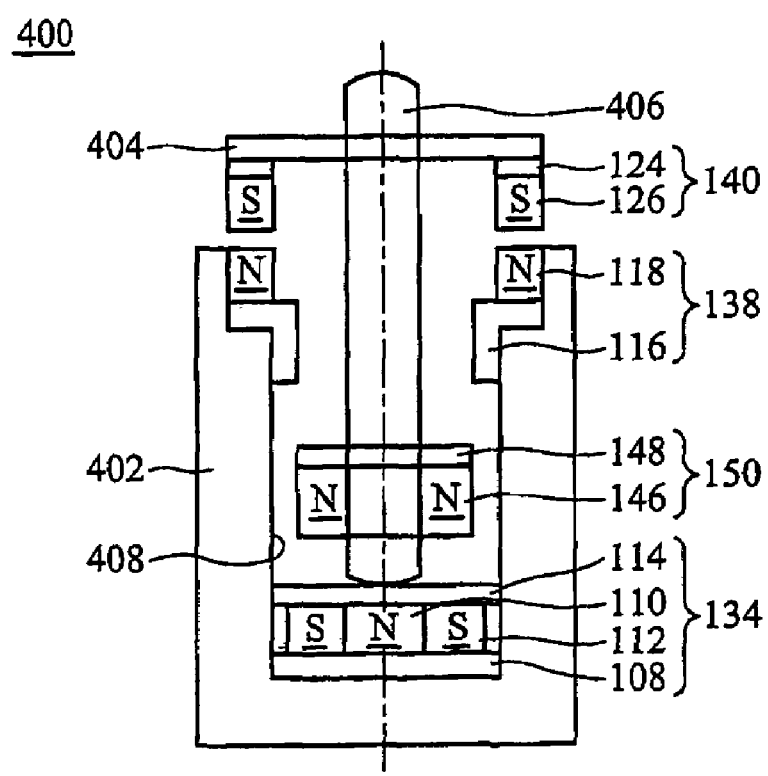
FIG. 4 is a schematic diagram of a magnetic bearing assembly of another varied embodiment of the first embodiment of the invention.

FIG. 4 is a schematic diagram of a magnetic bearing assembly 400 of a variation of an embodiment of the invention, from which elements common to the first embodiment are omitted.

The magnetic bearing assembly 400 comprises hubs 402, 404 and a shaft 406. The hub 402 comprises magnetic structures 138 and 134. The hub 404 and the shaft 405 comprise magnetic structures 140 and 150 corresponding to the magnetic structures 138 and 134, respectively. Specifically, the magnetic structure 134 is disposed at a bottom of the opening 408. The magnetic structure 138 is disposed on a periphery of the opening 408. The position and the poles of the magnetic structure 150 correspond to those of the magnetic structure 134 on the end of the shaft 406. The position and the poles of the magnetic structure 140 correspond to those of the magnetic structure 138 on the hub 404. The shaft 406 protrudes from a side of the hub 404 or protrudes from both sides thereof.

The shaft 406 and the hub 404 are integrally formed as a single piece or can be connected by inserting, engaging, or gluing. The shaft 406 comprises magnetic conduction metal, magnetic conduction plastics, or other magnetic conduction materials. The shaft 406 may directly contact the wear-resistant structure 114, or contact the wear-resistant structure 114 via intermediate structures such as ball bearings. An end surface of the shaft 406 is flat, curved, tapered with curved end, concave or convex. The shaft 406 contacts the wear-resistant structure 114 at a contact point or via a little contact area. The hubs 404 and 402 comprise plastics, magnetic conduction metal, magnetic conduction plastics, or other magnetic conduction materials.

The magnetic bearing 400 can be inserted in a stator base of a fan assembly or motor via the hub 402. The other hub 404 connects to a rotor of a fan assembly or motor. In this case, the rotor does not require a shaft. Thus, the embodiments of the invention provide lower friction, enhanced performance, longer product life, and lower noise.

Figure 5:
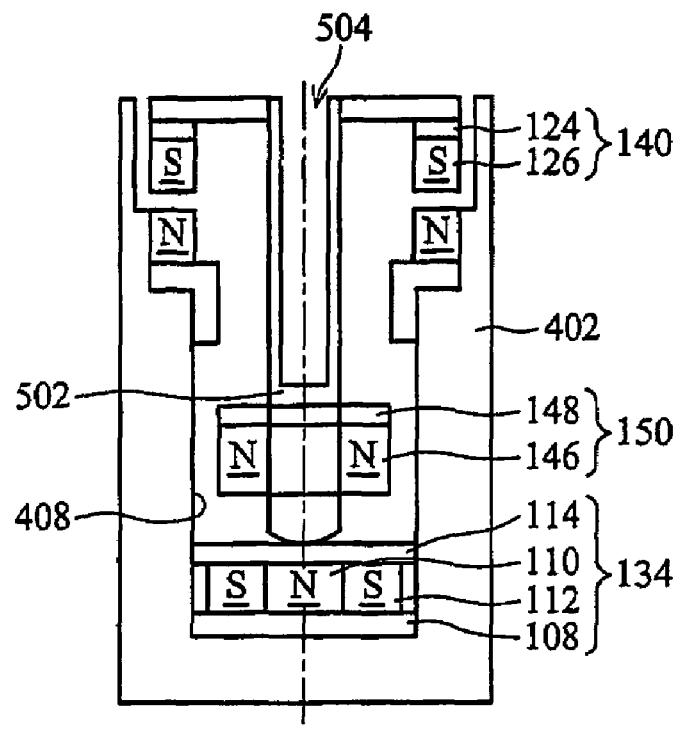
FIG. 5 is a schematic diagram of a magnetic bearing assembly of a variation according to FIG. 4.

The magnetic bearing assembly can be modified as shown in FIG. 5. The difference between the magnetic bearing assemblies 400 and 500 is that the magnetic bearing assembly 500 comprises the hub 502 with an opening 504 and a protrusion protruded from a side of the main body of the hub 502. The entrance of the opening 504 is located on other side of the main body of the hub 502 away from the magnetic structure 134. The fan has a shaft that can be directly inserted through the opening 504 such that the rotor and the hub 502 are connected.

Figure 6:
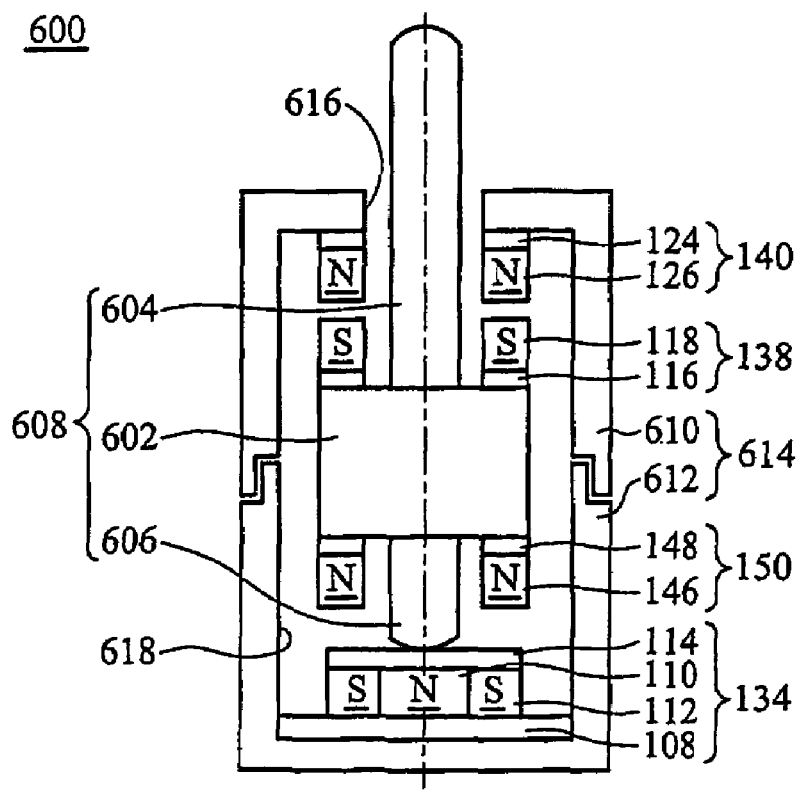
FIG. 6 is a schematic diagram of a magnetic bearing assembly of yet another variation according to FIG. 4.

FIG. 6 is a schematic diagram of a magnetic bearing assembly 600 of another embodiment of the invention. The difference between the magnetic bearing assemblies 400 and 600 is that the magnetic bearing assembly 600 is an independent closed type bearing. The magnetic bearing assembly 600 comprises a hub 614 and a rotor (hub) 608. The hub 614 comprises a hollow portion 618 and the shaft 608 is disposed in the hollow portion 618, contained in the hub 614 and contacting at a contact point. The hub 614 can be an integral formed as a single piece or comprise sub hubs 610 and 612 or a plurality of hubs. Magnetic structures 140 and 134 are disposed on inner-surfaces of an upper and lower ends of the hub 614, respectively. The magnetic structure 140 encircles an opening 616.

The rotor 608 comprises a loader (main body) 602, a protrusion 604 located on a top of the loader 602, and a protrusion 606 located at a bottom of the loader 602 as a rotational pivot point. Another set of magnetic structures 138 and 150 with opposite polarity are disposed on a portion of the loader 602 in vicinity of the magnetic structures 140 and 134. Thus, attractive force between the magnetic structures 140 and 138 and between the magnetic structures 134 and 150 ensures the rotor 608 magnetically suspended in the hub 608.

Furthermore, the hubs 402 and 404, hubs 502 and 402, the rotor 608 and the hub 614 are connected via a contact point or a little contact area, or without any contact therebetween.

Additionally, the invention is not limited to the disclosed embodiments. Variations may be applied to embodiments of the bearing structure.

In practice, the protrusion is fixed on the rotor of the fan or motor, and the hub is fixed on the stator base. Thus, embodiments of the invention provide lower friction, enhanced performance, longer product life, and lower noise.

The described embodiments disclose that a solenoid on the magnetic pole of the stator is a radial solenoid. An axial solenoid can be one of the selections of the solenoid. Moreover, the motor is applicable in an axial flow fan motor. Embodiments of the invention may be also applied in a frameless motor, a centrifugal fan motor, a motor with a radial solenoid, a motor with an axial solenoid, a motor with an outer rotor, or a motor with an inner rotor.

The previously described embodiments may be combined or partially combined and varied.

In a motor, due to the buoyant force during operation and magnetic attraction in the shaft, the shaft contacts the stator at a contact point or without any contact. Thus, the noise of the motor is greatly reduced, thereby increasing product life.

Hence, embodiments of the invention eliminate the conventional bearing motor, replacing it with an enhanced motor such that the performance of the motor is optimized, noise is minimized, and manufacturing costs are reduced.

While the invention has been described by way of example and in terms of the preferred embodiments, it is to be understood that the invention is not limited to the disclosed embodiments. On the contrary, it is intended to hub various modifications and similar arrangements as would be apparent to those skilled in the art. Therefore, the scope of the appended claims should be accorded the broadest interpretation so as to encompass all such modifications and similar arrangements.

What is claimed is:

1. A motor, adapted to be used in a fan, comprising:
   a stator, comprising a stator base with an opening, a first magnetic structure disposed at a bottom of the opening or a protrusion protruding from a sidewall of the opening, and a second magnetic structure disposed at a portion of the stator base encircling the opening;
   a rotor coupled to the stator, comprising a hub, a shaft, a third magnetic structure disposed at the hub, encircling one end of the shaft and corresponding to the first magnetic structure, and a fourth magnetic structure disposed at the hub without contacting the second magnetic structure;
   a housing, surrounding to stator and the rotor; and
   a fifth magnetic structure disposed at the other end of the shaft protruding from the other side of the hub; and
   a sixth magnetic structure disposed at the housing above and not touching the fifth magnetic structure;
   wherein magnetic attraction is generated between the first and the third magnetic structures; and magnetic attraction is generated between the second and the fourth magnetic structures.

2. The motor as claimed in claim 1, further comprising a wear-resistant structure, positioned between the first magnetic structure and the end of the shaft, contacting the end of the shaft at a contact point or a little contact area.

3. The motor as claimed in claim 2, wherein the surface of the wear-resistant structure is flat, spherical, curved, elliptical, concave or convex or tapered with a curved end.

4. The motor as claimed in claim 1, wherein the shape of the end of the shaft is flat, spherical, curved, elliptical, concave or convex or tapered with a curved end.

5. The motor as claimed in claim 1, wherein the first magnetic structure comprises a first magnet and a second magnet disposed at a periphery of the first magnet, generating magnetic attraction therebetween; the third magnetic structure and the second magnet attract each other, and the shaft and the first magnet attract each other.

6. The motor as claimed in claim 1, further comprising a magnetic conduction layer formed between the first magnetic structure and the bottom of the opening, the second magnetic structure and the magnetic pole, the third magnetic structure and the hub, or the fourth magnetic structure and the hub.

7. The motor as claimed in claim 6, wherein an axial cross section of the magnetic conduction layer is indented radially inward or outward, ring-shaped, circular, elliptical, polygonal, or flat.

8. The motor as claimed in claim 1, further comprising a wear-resistant structure, positioned between the sixth magnetic structure and the other end of the shaft, contacting the other end of the shaft at a contact point or a little contact area.

9. The motor as claimed in claim 8, wherein the surface of the wear-resistant structure is flat, spherical, curved, elliptical, concave or convex or tapered with a curved end.

10. The motor as claimed in claim 1, wherein a shape of the other end of the shaft is flat, spherical, curved, elliptical, concave or convex or tapered with a curved end.

11. The motor as claimed in claim 1, wherein the position of the first magnetic structure is higher or lower than that of the third magnetic structure.

12. The motor as claimed in claim 1, further comprising an intermediate structure, located between the first magnetic structure and the end of the shaft, or the end of the shaft and a wear-resistant structure.

13. The motor as claimed in claim 12, wherein a material of the intermediate structure is magnetic conduction metal, magnetic conduction plastics, or other magnetic conduction materials.

14. The motor as claimed in claim 12, wherein the intermediate structure comprises a curved face or a shape of the intermediate structure is spherical, elliptical, turbinate, tapered with a curved end, or arrow-shaped with a curved end.

15. A motor adapted to be used in a fan, comprising:

a stator, comprising a stator base with an opening, a first magnetic structure disposed at a bottom of the opening or a protrusion protruded from a sidewall of the opening;

a rotor coupled to the stator, comprising a hub, a shaft, a second magnetic structure disposed at the shaft protruding from a side of the hub and corresponding to the first magnetic structure, and a third magnetic structure disposed at the other end of the shaft protruding from the other side of the hub; and a housing surrounding the stator and the rotor, and comprising a fourth magnetic structure disposed at the housing above and without contacting the third magnetic structure;

wherein magnetic attraction is generated between the first and the second magnetic structures; and magnetic attraction is generated between the third and the fourth magnetic structures.

16. The motor as claimed in claim 15, wherein the second magnetic structure is disposed at the hub and encircles one end of the shaft.

* * * * *